A. K. BAKKEN.
NEST BOX FOR HENS.
APPLICATION FILED MAY 2, 1907.
910,484.
Patented Jan. 26, 1909.
2 SHEETS—SHEET 1.
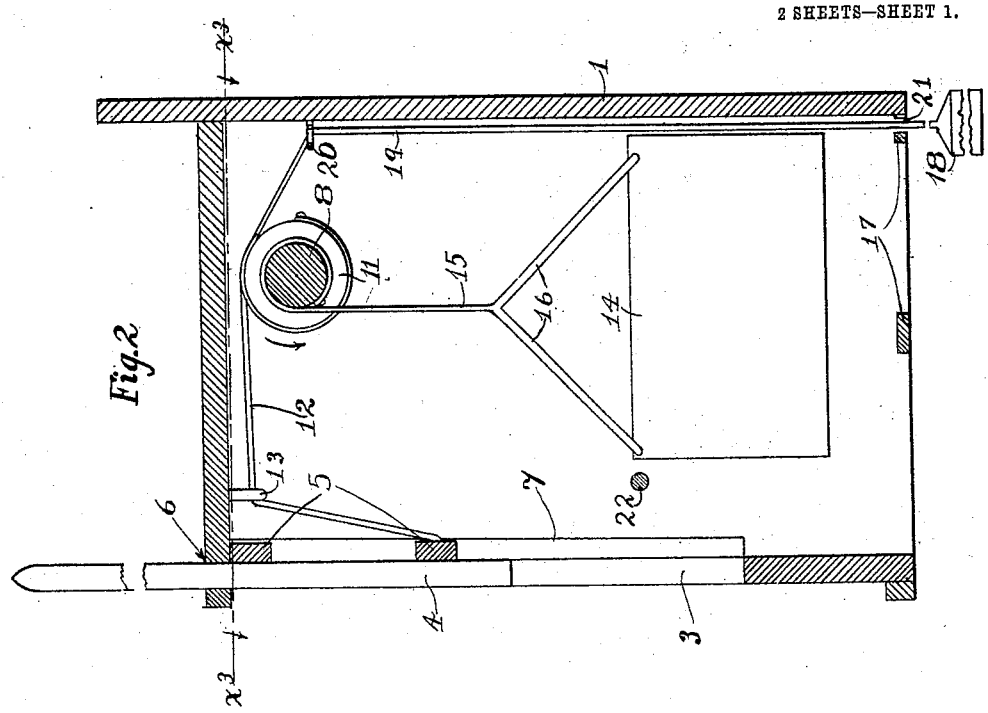
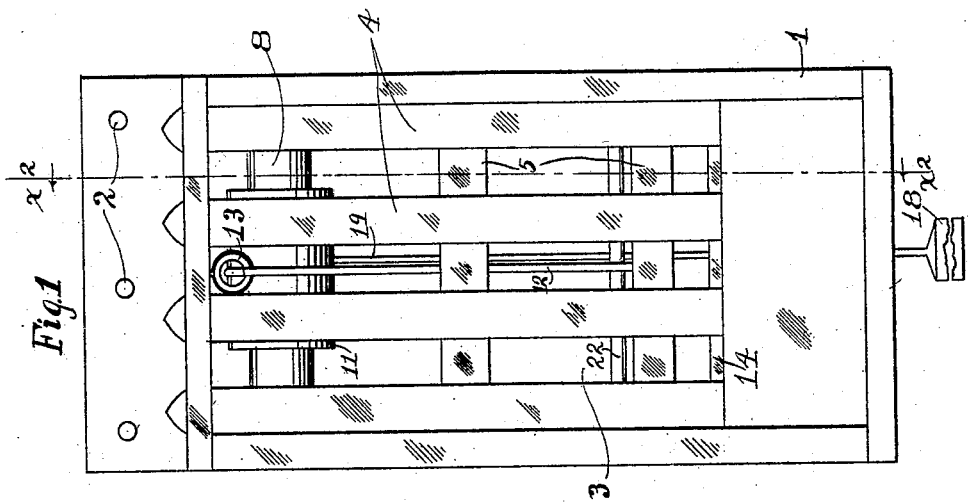
Witnesses:
Leon B. Losey.
H. L. Dittbrenner
Inventor
Andrew K. Bakken
By his Attorneys
Williamson & Merchant
THE NORRIS PETERS CO., WASHINGTON, D. C.

A. K. BAKKEN.
NEST BOX FOR HENS.
APPLICATION FILED MAY 2, 1907.

910,484.

Patented Jan. 26, 1909.

2 SHEETS—SHEET 2.

Witnesses
Leon B. Losey
H. L. Dittbenner

Inventor:
Andrew K. Bakken
By his Attorneys
Williamson & Merchant

UNITED STATES PATENT OFFICE.

ANDREW K. BAKKEN, OF SHARON, NORTH DAKOTA.

NEST-BOX FOR HENS.

No. 910,484.　　　Specification of Letters Patent.　　　Patented Jan. 26, 1909.

Application filed May 2, 1907. Serial No. 371,507.

*To all whom it may concern:*

Be it known that I, ANDREW K. BAKKEN, a citizen of the United States, residing at Sharon, in the county of Steele and State of North Dakota, have invented certain new and useful Improvements in Nest-Boxes for Hens; and I do hereby declare the following to be a full, clear, and exact description of the invention, such as will enable others skilled in the art to which it appertains to make and use the same.

My invention has for its especial object to provide an improved nest box for hens, and to this end, it consists of the novel devices and combinations of devices hereinafter described and defined in the claim.

In the accompanying drawings, which illustrate the invention, like characters indicate like parts throughout the several views.

Figure 3:
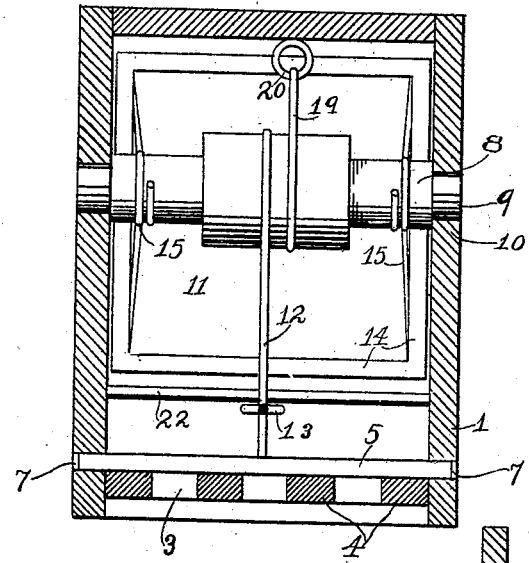
Figure 4:
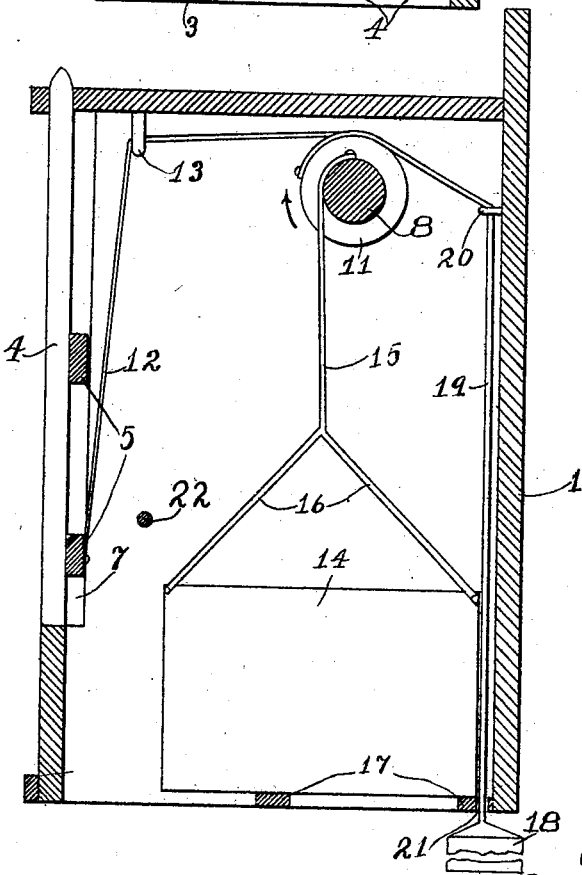

Referring to the drawings, Figure 1 is a front elevation of a coop. Fig. 2 is a longitudinal vertical section taken on the line $x^2 \, x^2$ of Fig. 1. Fig. 3 is a horizontal section taken approximately on the line $x^3 \, x^3$ of Fig. 2; and Fig. 4 is a view corresponding to Fig. 2, but with the working parts shown in different positions.

The numeral 1 indicates a rectangular coop having an open bottom. The back of the said coop extends above the top thereof, and is provided with several holes 2. Said coop 1 may be supported by nails or screws passed through the holes 2 and driven or screwed into the wall of a chicken house, or any suitable support, not shown. The coop 1 is also provided with a door opening 3 adapted to be closed by a suitable door 4 preferably made, as shown, of laterally spaced strips secured together by cross bars 5 for the purpose of admitting light and air. The upper portion of said door 4 works through a slot 6 in the top of the coop 1. Long slots 7, formed in the sides of said coop 1, are adapted to receive the projecting ends of the bars 5 for the purpose of guiding the door in its sliding movement. A differential windlass is mounted within the coop 1 near the top thereof.

The numeral 8 indicates the relatively small portion of the windlass drum, having reduced end portions 9 that are mounted in suitable seats 10 formed in the sides of the coop 1, and the numeral 11 indicates the relatively large intermediate portion of said windlass drum. A windlass cable 12 is connected at one end to the lower bar 5 of the door 4, and at its other end to the relatively large portion 11 of the windlass drum. Said cable 12 is guided by an eye 13 secured to the top of the coop 1. A nest box 14, for the purpose of holding a suitable nest, is located within said coop. Connected to the outer end portions of the relatively small portion 9 of said windlass drum are a pair of windlass cables 15, the lower ends of which are provided with branch cables 16 connected to the four corners of the nest box 14. As is evident, the door 4 is raised much faster than the nest box is lowered. Laterally spaced slats 17 are secured to the bottom of the coop 1.

To hold the door 4 and the nest box 14 in their raised positions, a yielding device in the form of a counter-weight 18 located below the bottom of the coop 1, is connected to the relatively large portion 11 of the windlass drum, by a cable 19. Said cable 19 is guided by an eye 20 secured to the back of the coop 1, and a hole 21 in one of the slats 17. A perch 22 extends across the coop 1 between the door 4 and the nest box 14, and is secured to the sides of the coop 1 by any suitable means.

The operation of the device may be briefly described as follows: The counter-weight 18 is of sufficient weight to rotate the windlass drum in the direction of the arrow marked on Fig. 4, and to hold the door 4 and nest box 14 in their uppermost positions. The upward movement of the door is limited by the engagement of the uppermost cross bar 5 of the door 4 with the top of the coop 1. The door 4 being open, as just described, a hen may pass through the door opening 3 and onto the nest box 14. The weight of the hen will be sufficient to overcome the counter-weight 18, thereby lowering the nest box 14 until it rests upon the cross slats 17. As the nest box 14 is being lowered, the cables 15—16 will cause the windlass drum to rotate in the direction marked on Fig. 2, thereby unwinding the cable 12 and permitting the door 4 to close. In getting off the nest, the hen will stand upon the perch 22, at which time the counter-weight 18 will raise the nest box 14 and the door 4 to their normal positions.

In actual use, the improved nest box just described has been highly efficient for the purpose had in view. The improved nest box is especially well adapted for sitting hens.

What I claim is:—

The combination with a coop having a door, of a windlass drum having a relatively large intermediate portion and relatively small end portions supported by said coop, a nest box within the coop, cables connecting the nest box to the end portions of said drum and connecting the door to the intermediate portion of said drum, and means operative on said drum to normally hold the door open and to hold the nest box in an elevated position and suspended from the drum but permitting the drum to rotate to close the door when the hen is on the nest, substantially as described.

In testimony whereof I affix my signature in presence of two witnesses.

ANDREW K. BAKKEN

Witnesses:
   T. S. HUNT,
   S. S. LARSEN.